(12) United States Patent
Yeung et al.

(10) Patent No.: US 7,644,067 B2
(45) Date of Patent: Jan. 5, 2010

(54) SYSTEM AND METHOD FOR ACCESSING CONTENT FROM SELECTED SOURCES VIA A DOCUMENT PROCESSING DEVICE

(75) Inventors: Michael Yeung, Mission Viejo, CA (US); Man Mohan Garg, Cerritos, CA (US); Alok Mathur, Lake Forest, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 275 days.

(21) Appl. No.: 11/453,130

(22) Filed: Jun. 14, 2006

(65) Prior Publication Data
US 2007/0294204 A1 Dec. 20, 2007

(51) Int. Cl.
*G06F 17/30* (2006.01)
(52) U.S. Cl. .................. 707/3; 707/1; 707/10; 707/100; 358/1.18; 358/1.13
(58) Field of Classification Search ........................ None
See application file for complete search history.

(56) References Cited

U.S. PATENT DOCUMENTS

| | | | | |
|---|---|---|---|---|
| 6,088,707 A * | 7/2000 | Bates et al. | ................. | 715/235 |
| 6,460,060 B1 * | 10/2002 | Maddalozzo et al. | ........ | 715/234 |
| 6,476,930 B1 * | 11/2002 | Roberts et al. | ............. | 358/1.18 |
| 6,650,431 B1 * | 11/2003 | Roberts et al. | ............. | 358/1.15 |
| 7,310,769 B1 * | 12/2007 | Dash | ........................... | 715/205 |
| 2002/0161801 A1 * | 10/2002 | Hind et al. | ................... | 707/513 |
| 2003/0023695 A1 * | 1/2003 | Kobata et al. | ................ | 709/206 |
| 2005/0021545 A1 * | 1/2005 | Lulich et al. | ................. | 707/100 |
| 2005/0097180 A1 * | 5/2005 | Abdelhak | .................... | 709/208 |
| 2005/0289127 A1 * | 12/2005 | Giampaolo et al. | ............ | 707/3 |
| 2006/0112081 A1 * | 5/2006 | Qureshi | ......................... | 707/3 |
| 2007/0076874 A1 * | 4/2007 | Suleiman et al. | ............ | 380/243 |

* cited by examiner

*Primary Examiner*—Khanh B Pham
*Assistant Examiner*—Andalib F Lodhi
(74) *Attorney, Agent, or Firm*—Tucker Ellis & West, LLP (57) ABSTRACT

The subject application is directed to a system and method for the content retrieval and routing via a document processing device. The document processing device first receives output routing data from an associated user corresponding to a desired destination for retrieved content. The device then receives a content query from the user corresponding to desired content data available from an external source. The query is then routed to the external source and content data in response to the query is retrieved by the document processing device. The content data is then routed from the document processing device to the designated output destination. The document processing device then periodically monitors for changes to the content data at the external source and when any changes are detected, updated content data is retrieved and forwarded to the output destination.

14 Claims, 6 Drawing Sheets

SYSTEM AND METHOD FOR ACCESSING CONTENT FROM SELECTED SOURCES VIA A DOCUMENT PROCESSING DEVICE

BACKGROUND OF THE INVENTION

The subject application is directed to a system and method for accessing content from selected sources via a document processing device. More particularly, the subject application is directed to a system and method for providing selected content from a source or storage repository, such as the Internet or a network storage repository, to a user via a document processing device.

Users of document processing devices, such as multifunctional peripheral devices, are requesting that more services, in addition to the traditional document processing services typically performed by such devices, be provided via such devices. For example, a user may desire to retrieve information from the Internet or from a selected storage repository. The user may also desire to set up workflow routines or schedules for distribution of documents. In current systems, the user would have to access a computer or other similar device with the ability to provide such information or services. Once the user has received the requested information or performed the selected service, the user may desire a hard copy of the information retrieved or a log of the service performed. The user will then have to transmit the received information or log from the computing device to a document processing device for output. If the user is using a handheld device or is not in an office environment, transmitting the information to a document processing device may be difficult. For a handheld device, the device must either have the capability to connect to a document processing device, either via a wired or wireless communication channel, or the user will have to store the information on a portable storage medium, wherein the information is transmitted via such medium to the document processing device. If the user is not in an office environment, the user will need to access the information via a computing device in communication with a document processing devices. Document processing devices located in a public facility are generally not in data communication with a computing device which may be accessed via a mobile user. Typically, the mobile user will have to pay a fee to use a computing device to access the information or perform the service, and save the information or service log to a portable storage medium. The user will then have to pay a fee to use the document processing device in order to output a hard copy of the information or service log. As such, there is a need for a system and method for providing content or services from external sources via a document processing device itself.

The subject application overcomes the above noted problems and provides a system and method for providing content and services from external sources directly from a document processing device.

SUMMARY OF THE INVENTION

In accordance with the subject application, there is provided a system and method for accessing content from selected sources via a document processing device.

Further, in accordance with the subject application, there is provided a system and method for providing content and services from external sources directly from a document processing device.

Still further, in accordance with the subject application, there is provided a system and method for providing selected content from a source or storage repository, such as the Internet or a network storage repository, to a user via a document processing device.

Still further, in accordance with the subject application, there is provided a content retrieval and routing document processing device. The device includes means adapted for receiving identification data corresponding to an associated user and means adapted for receiving routing data representative of at least one desired output destination. The device also includes means adapted for receiving query data from the associated user, which query data is representative of desired content from at least one of plurality of external data sources. The device further comprises means adapted for retrieving content data from the at least one external data source in accordance with received query data and routing means adapted for routing retrieved content data to the at least one associated output in accordance with received routing data.

Preferably, the at least one output is comprised of at least one of a print, electronic mail, data file, wireless transmission and visual display. Also, preferably the content data includes at least one of financial data, weather data, schedule data, event data, website data and map data.

In one embodiment, the device also comprises updating means adapted for periodically updating retrieved content via the at least one external data source in accordance with received identification data and the routing means includes means adapted for routing updated content to the at least one output destination in accordance with the received routing data. In a more preferred embodiment, the device further comprises monitoring means adapted for monitoring changes in content data and means adapted for initializing the updating means upon a detection of changed content data by the monitoring means.

In another embodiment, the device also comprises network interface means adapted for routing the query data to the at least one external data source via an associated network.

In yet another embodiment, the device further includes means adapted for receiving at least one electronic document selected by the associated user and means adapted for receiving document output instructions from the associated user corresponding to the at least one associated output. The device also includes merge means adapted for merging the at least one electronic document and the retrieved content data into a hybrid electronic document. In addition, the routing means includes means adapted for routing the hybrid electronic document to the at least one associated output.

Still further, in accordance with the subject application, there is provided a method for content retrieval and routing via the document processing device as described above.

Still other advantages, aspects and features of the subject application will become readily apparent to those skilled in the art from the following description wherein there is shown and described a preferred embodiment of the subject application, simply by way of illustration of one of the best modes best suited for to carry out the subject application. As it will be realized, the subject application is capable of other different embodiments and its several details are capable of modifications in various obvious aspects all without departing from the scope of the subject application. Accordingly, the drawing and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed a system and method for accessing content from selected sources via a document processing device. In particular, the subject application is directed to a system and method for providing content and services from external sources directly from a document processing device. More particularly, the subject application is directed to a system and method for providing selected content from a source or storage repository, such as the Internet or a network storage repository, to a user via a document processing device.

Figure 1:
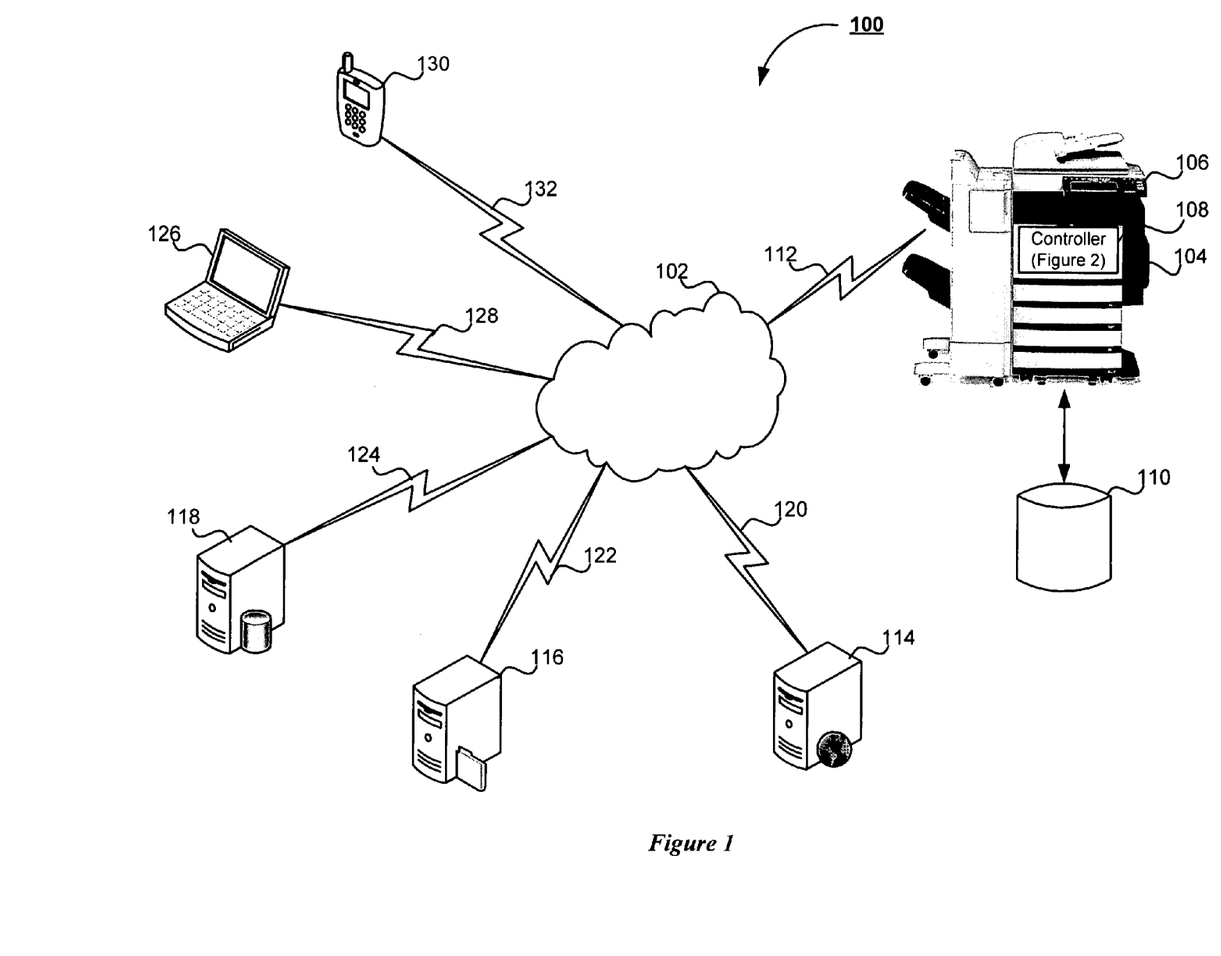
FIG. 1 is an overall diagram of the system for content retrieval and routing via a document processing device according to the subject application.

Referring now to FIG. 1, there is shown an overall diagram of the system 100 for accessing content form selected sources via a document processing device in accordance with the subject application. As shown in FIG. 1, the system 100 employs a distributed computing environment, represented as a computer network 102. It will be appreciated by those skilled in the art that the computer network 102 is any distributed communications environment known in the art capable of enabling the exchange of data between two or more electronic devices. Those skilled in the art will further appreciate that the network 102 is any computer network known in the art including, for example and without limitation, a virtual area network, a local area network, a personal area network, the Internet, an intranet, a wide area network, or any suitable combination thereof. Preferably, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms.

The system 100 includes at least one document processing device 104, represented as a multifunction peripheral device, suitably adapted to perform a variety of document processing operations. It will be understood by those skilled in the art that the variety of document processing services provided by the document processing device 104, includes, for example and without limitation, electronic mail, scanning, copying, facsimile, document management, printing, and the like. Suitable commercially available document processing devices include, but are not limited to, the Toshiba e-Studio Series Controller. In one embodiment, the document processing device 104 is suitably equipped to receive a plurality of portable storage media, including without limitation, Firewire drive, USB drive, SD, MMC, XD, Compact Flash, Memory Stick, and the like. In the preferred embodiment of the subject application, the document processing device 104 further includes an associated user-interface 106, such as a touch-screen interface, LCD display, or the like, via which an associated user is able to interact directly with the shared multi-function peripheral device 104. Preferably, the associated user-interface 106 is suitably adapted to provide a graphical user-interface via which the associated user is able to select various content for downloading from external sources, select electronic documents stored via the computer network 102, and the like. Preferably, the document processing device 104 includes hardware, software, and any suitable combination thereof, configured to interact with the associated user and provide such information thereupon.

In accordance with the subject application, the first document processing device 104 further incorporates a controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, control the display of images via the user-interface 106, performing update searching, performing routing operations, and the like. The functioning of the controller 108 will better be understood in conjunction with the block diagrams illustrated in FIGS. 2 and 3, explained in greater detail below.

In accordance with the preferred embodiment of the subject application, the document processing device 104 further includes a data storage device 110, communicatively coupled to the document processing device 104, suitably adapted to provide document storage, user information storage, content data storage, network addresses of public and commercial service providers, and the like. As will be understood by those skilled in the art, the data storage device 110 is any mass storage device known in the art including, for example and without limitation, a hard disk drive, other magnetic storage devices, optical storage devices, flash memory devices, or any combination thereof. It will be appreciated by those skilled in the art that while illustrated in FIG. 1 as being a separate component of the system 100, the data storage device 110 is capable of being implemented as internal storage of the document processing device 104, such as, for example and without limitation, an internal hard disk drive, or the like.

In accordance with one embodiment of the subject application, the document processing device 104 is in data communication with the computer network 102 via a suitable communications link 112. As will be appreciated by the skilled artisan, a suitable communications link 112 employed in accordance with the subject application includes, WiMax, 802.11a, 802.11b, 802.11g, 802.11(x), Bluetooth, the public switched telephone network, a proprietary communications network, infrared, optical, or any other suitable wired or wireless data transmission communications known in the art.

In addition, the system 100 includes at least one web server 114, suitably adapted to provide external resources accessible to the document processing device 104 via the computer network 102. The skilled artisan will appreciate that the web server 114 is representative of any external resource provider, e.g., a public or commercial network service provider, known in the art, including, for example and without limitation, a financial data provider, a weather data provider, a schedule data provider, an event data provider, a news data provider, a website data provider, a map data provider, and the like. It will be understood by those skilled in the art that the web server 114 is any software, hardware, or combination thereof, suitably adapted to provide external resources to the user via the computer network 102. The web server 114 is communicatively coupled to the computer network 102 via a suitable communications link 120. The communications link 120 is any suitable means of data communication known in the art, including, for example and without limitation, infrared, optical, a proprietary communications network, the public switched telephone network, Bluetooth, WiMax, 802.11a, 802.11b, 802.11g, or 802.11(x), or any other suitable wire-based or wireless data transmission means known in the art. In accordance with one aspect of the subject application, the communications link 120 is capable of being implemented as a secure communications link, so as to enable the user to retrieve secure user-related data via the computer network 102 at the document processing device 104.

As shown in FIG. 1, the system 100 also includes a document management server 116, suitably adapted to provide document management services via the computer network 102. The skilled artisan will appreciate that the document management server 116 is any software, hardware, or combination thereof, suitably adapted to provide document management services to the computer network 102. Suitable document management services include, for example and without limitation, secure document storage, document management, restricted document access, and the like. The management server 116 is communicatively coupled to the computer network 102 via a suitable communications link 122. The communications link 122 is any suitable means of data communication known in the art, including, for example and without limitation, infrared, optical, a proprietary communications network, the public switched telephone network, Bluetooth, WiMax, 802.11a, 802.11b, 802.11g, or 802.11(x), or any other suitable wire-based or wireless data transmission means known in the art. In the preferred embodiment of the subject application, the communications link 122 is suitably adapted to provide a secure communications channel between the document management server 116 and any other electronic device coupled to the computer network 102, as will be appreciated by those skilled in the art. Preferably, the communications link 122 ensures the security of the electronic documents that are accessible via the computer network 102 using data security protocols, such as web security protocols, in accordance with the subject application.

Communicatively coupled to the computer network 102 is a network storage or repository, illustrated in FIG. 1 as the network repository server 118. As will be understood by those skilled in the art, the network repository server 118 is representative of a network repository, suitably adapted to receive and store electronic documents, downloaded data, user data, address data, and the like. In accordance with the preferred embodiment of the subject application, the network repository server 118 comprises a mass storage device, as are known in the art, including, for example and without limitation, magnetic storage devices, optical storage devices, hard disk drives, solid-state memory devices, or any suitable combination thereof. Preferably, the network repository server 118 is suitably adapted to securely store such data, so as to prevent unauthorized access via any suitable means known in the art. The network repository server 118 is communicatively coupled to the computer network 102 via a suitable communications link 124. The communications link 124 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art.

The system 100 further includes a user device 126, suitably adapted to generate electronic document data for storage via the document management server 116, the network repository 118, or the like. Preferably, the user device 126 is communicatively coupled to the computer network 102 via a suitable communications link 128. It will be appreciated by those skilled in the art that the user device 126 is depicted in FIG. 1 as a laptop computer for illustration purposes only. As the skilled artisan will understand, the user device 126 shown in FIG. 1 is representative of any personal computing device known in the art, including, for example and without limitation, a computer workstation, a personal computer, a personal data assistant, a web-enabled cellular telephone, a smart phone, or other web-enabled electronic device. The communications link 128 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 126 is suitably configured to communicate, via the computer network 102, with the web server 114, the document management server 116, the network repository server 118, the document processing device 104, or other electronic device in data communication with the computer network 102.

In addition to the foregoing, the system 100 includes a web-enabled portable electronic device, illustrated in FIG. 1 as a web-enabled cellular telephone 130. The skilled artisan will appreciate that the illustration of a cell phone 130 is for example purposes only, and is representative of any portable electronic device known in the art capable of wireless data communication with the computer network 102 including, for example and without limitation, a smart phone, a portable electronic mail device, a web-enabled personal data assistant, or the like. According to one embodiment of the subject application, the cell phone 130 is in data communication with the computer network 102 via a suitable communications link 132. Suitable communications channels include, for example and without limitation, 802.11a, 802.11b, 802.11g, 802.11(x), a proprietary communications network, infrared, optical, the public switched telephone network, Bluetooth, WiMax, or any suitable wireless data transmission system, or wired communications known in the art. In accordance with the preferred embodiment of the subject application, the cell phone 130 is suitably adapted to communicate directly with the document processing device 104 via a wireless data link, e.g., 802.11(x), Bluetooth, infrared, optical, WiMax, or the like. The skilled artisan will appreciate that such an embodiment of the subject application employs the cell phone 130 as being in direct data communication with the document processing device 104 outside of the computer network 102.

Figure 2:
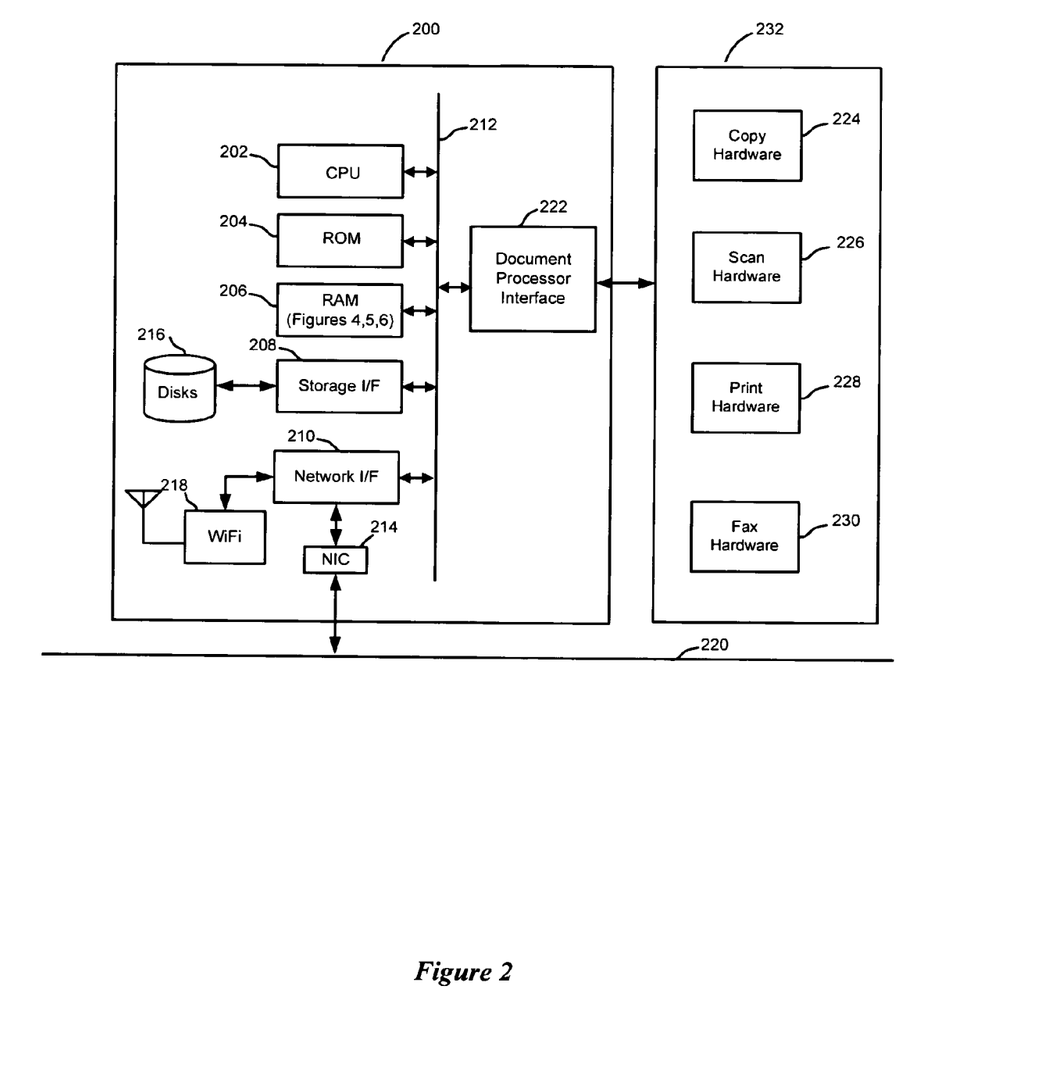
FIG. 2 is a block diagram illustrating controller hardware for use in the system for content retrieval and routing via a document processing device according to the subject application.

Turning now to FIG. 2, illustrated is a representative architecture of a suitable controller 200, shown as the controller 108 in FIG. 1, on which operations of the subject system 100 are completed. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. Network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and network interface subsystem 210 is suitably accomplished via a bus data transfer mechanism, such as illustrated by bus 212.

Also in data communication with the bus 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the 200 suitably operates any or all of the aforementioned document processing operations. Systems accomplishing more than one document processing operation are commonly referred to as multifunction peripherals or multifunction devices.

Figure 3:
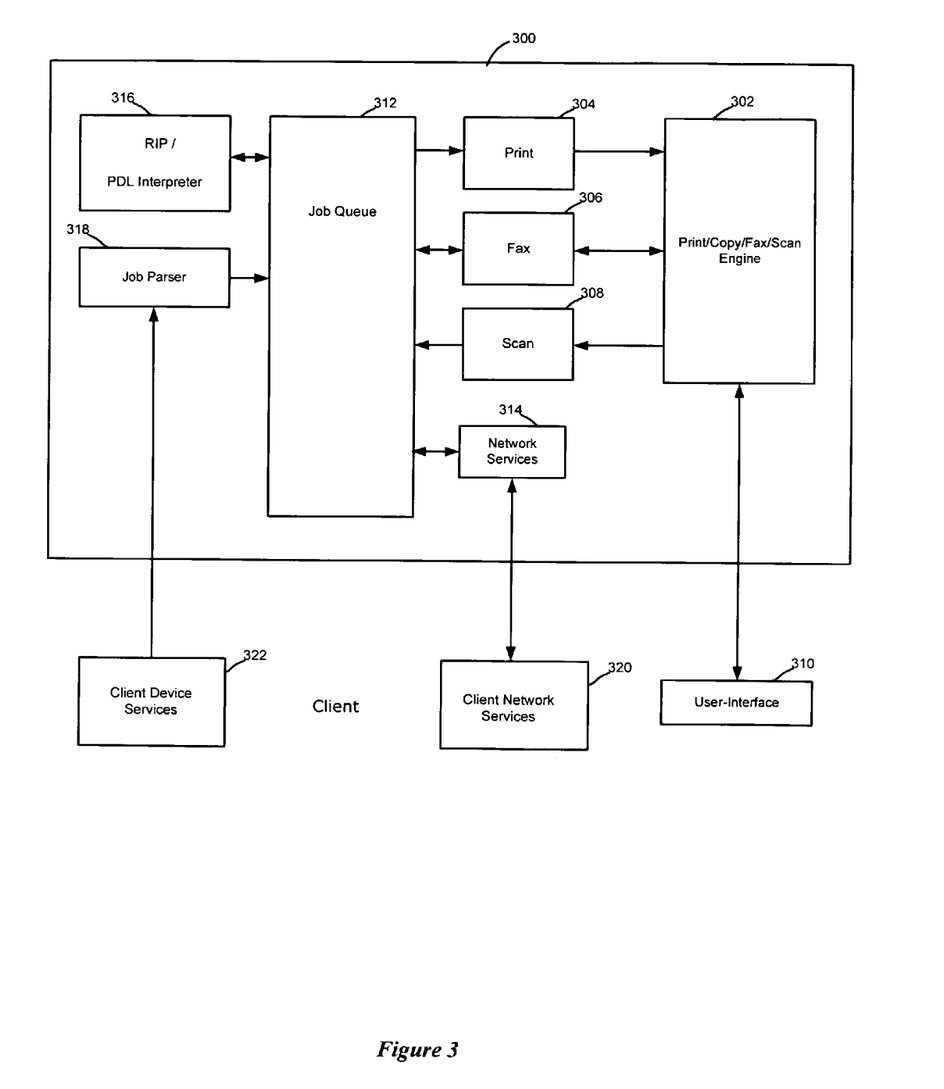
FIG. 3 is a functional block diagram illustrating the controller for use in the system for content retrieval and routing via a document processing device according to the subject application.

Functionality of the subject system is accomplished on a suitable document processing device that includes the controller 200 of FIG. 2 as an intelligent subsystem associated with a document processing device. In the illustration of FIG. 3, controller function 300 in the preferred embodiment, includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably via an interface local to the controller, or remotely via a remote thin or thick client.

The engine 302 is in data communication with printer function 304, facsimile function 306, and scan function 308. These devices facilitate the actual operation of printing, facsimile transmission and reception, and document scanning for use in securing document images for copying or generating electronic versions.

A job queue 312 is suitably in data communication with printer function 304, facsimile function 306, and scan function 308. It will be appreciated that various image forms, such as bit map, page description language or vector format, and the like, are suitably relayed from scan function 308 for subsequent handling via job queue 312.

The job queue 312 is also in data communication with network services 314. In a preferred embodiment, job control, status data, or electronic document data is exchanged between job queue 312 and network services 314. Thus, suitable interface is provided for network based access to the controller 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. Network services 314 also advantageously supplies data interchange with client side services 320 for communication via FTP, electronic mail, TELNET, or the like. Thus, the controller function 300 facilitates output or receipt of electronic document and user information via various network access mechanisms.

Job queue 312 is also advantageously placed in data communication with an image processor 316. Image processor 316 is suitably a raster image process, page description language interpreter or any suitable mechanism for interchange of an electronic document to a format better suited for interchange with device services such as printing 304, facsimile 306 or scanning 308.

Finally, job queue 312 is in data communication with a parser 318, which parser suitably functions to receive print job language files from an external device, such as client device services 322. Client device services 322 suitably include printing, facsimile transmission, or other suitable input of an electronic document for which handling by the controller function 300 is advantageous. Parser 318 functions to interpret a received electronic document file and relay it to a job queue 312 for handling in connection with the aforedescribed functionality and components.

In operation, the controller 108 associated with the document processing device 104 first receives user identification information, or data, from an associated user via the user-interface 106. Preferably, the user identification information corresponds to a user ID/password, biometric data, identification number, or the like. In accordance with one aspect of the subject application, the identification information is capable of being transmitted from the cell phone 130 when in proximity to the document processing device 104, i.e., via a Bluetooth connection between the two devices 130 and 104.

The skilled artisan will appreciate that the identification information is capable of being used, for example, to identify the user with respect to access rights, security, account information, external resource access, or the like. The associated user, via the user-interface 106, selects an output destination corresponding to a desired output destination of any content retrieved by the document processing device 104 for the associated user. The skilled artisan will appreciate that suitable output destinations include, for example and without limitation, print, electronic mail, data file (for storage), wireless transmission, visual display (via user-interface 106), or the like.

The user is then prompted by the controller 108 to input a query for content data to be retrieved by the document processing device 104. That is, the user requests a map data, event data, website data, financial data, schedule data, a particular file from the network repository 118, an electronic document via the document management server 116, or the like. The skilled artisan will appreciate that such a query is capable of being submitted by the user via a search engine, e.g., GOOGLE, YAHOO!, ASK.COM, etc., through the user-interface 106 associated with the document processing device 104. The controller 108 associated with the document processing device 104 then routes the submitted query to an external resource, i.e., external to the document processing device 104, such as a website (web server 114), the document management server 116, the network repository 118, or the like. Preferably, the network addresses of the web server 114, the document management server 116, and the network repository 118 are known to the controller 108 and stored on the data storage device 110. In accordance with one embodiment of the subject application, the controller 108 associated with the document processing device 104, using the identification data supplied by the user, is suitably adapted to retrieve a listing of network addresses, i.e., bookmarks, associated with the user from which the user selects a desired external resource. The skilled artisan will appreciate that the user is capable of selecting an external resource not in the bookmarks via a suitable browser application, via the associated user-interface 106.

The document processing device 104, via the computer network 102, receives content data from the external resource corresponding to the submitted query and routes the content data to the designated output destination. That is, once the controller 108 associated with the document processing device 104 has received the requested content data from the web server 114, the document management server 116, or the network repository 118, the retrieved data is then forwarded to the output destination selected by the user, e.g., an electronic mail address associated with the user device 126 or the cell phone 130, a file location on the network repository 118, a hardcopy output by the document processing device 104, display on the associated user-interface 106, or the like. The controller 108 then periodically monitors the external resource for changes to the content data previously received. For example, when the submitted query was for a map available from the external web server 114, the controller 108 associated with the document processing device 104 periodically monitors the web server 114 for updates, e.g., traffic, construction, etc., associated with the retrieved map. When updated content data is detected, the updates are routed to the designated output destination, e.g., to the cell phone 130 carried by the associated user. It will be appreciated that the document processing device 104 is capable of continuing to monitor such content for updates until a predetermined time has expired, a cancel request has been received, or any other means of termination known in the art.

In accordance with one aspect of the subject application, the document processing device 104 is capable of making a determination, prior to the routing of the content data to the designate output destination, whether the user has also requested or submitted an electronic document to the document processing device 104 for processing. When such a determination is made, the document processing device 104 receives output instructions from the user via the user-interface 106 corresponding to a desired output type. The received content and the electronic document are then merged, via any suitable means known in the art, into a hybrid electronic document. The hybrid document is then routed to the designated output destination and the document processing device 104 proceeds with the monitoring for content changes, as set forth above.

Figure 4:
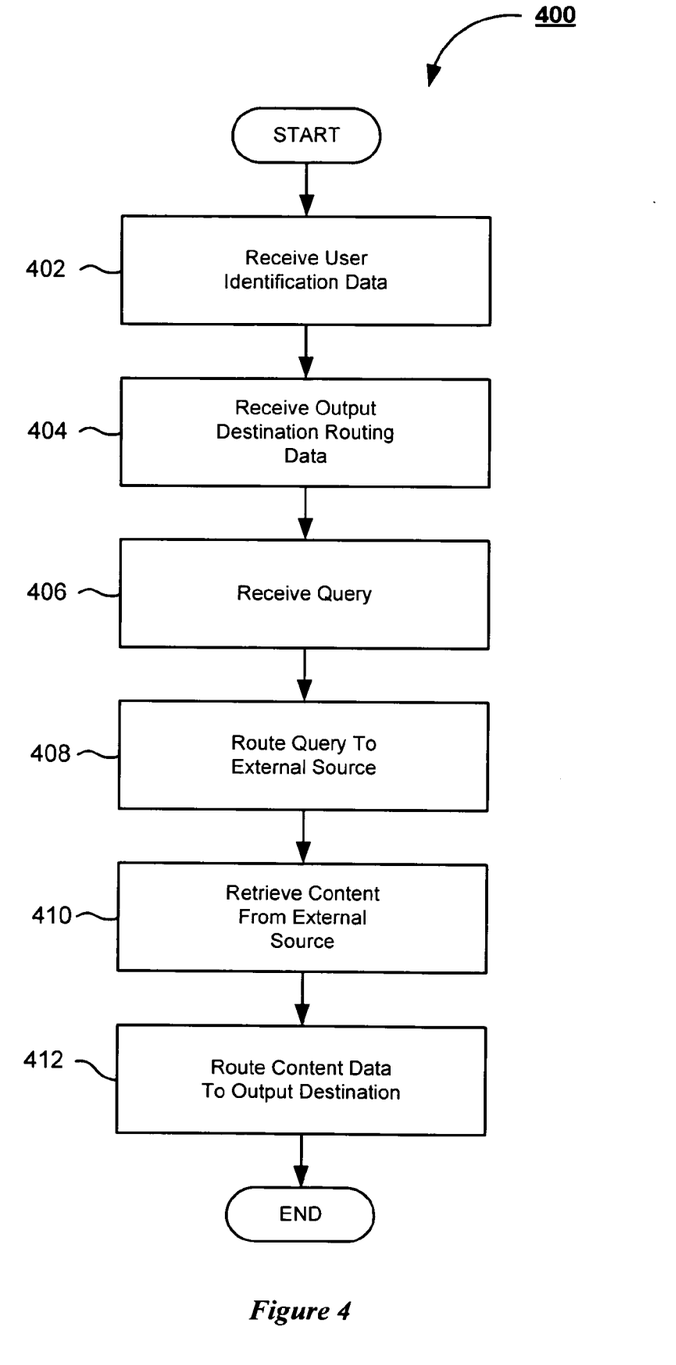
FIG. 4 is a flowchart illustrating a method for content retrieval and routing via a document processing device according to the subject application.

The foregoing system 100 and components depicted in FIGS. 1, 2, and 3, will better be understood when viewed in conjunction with the methodology depicted in FIG. 4, FIG. 5, and FIG. 6, discussed hereinafter. Turning now to FIG. 4, there is shown a flowchart 400 illustrating the method for content retrieval and routing via a document processing device in accordance with the subject application. Beginning at step 402, the document processing device 104 receives user identification data from an associated user. Preferably, the identification data is received from the user via the associated user-interface 106. The document processing device 104 then receives output destination routing data at step 404 corresponding to a desired output destination selected by the associated user. The skilled artisan will appreciate that a suitable output routing includes, for example and without limitation, print, electronic mail, wireless transmission, a visual display, or the like. A query is then received by the document processing device 104 at step 406. Preferably, the query includes data representative of a desired content selected by the associated user via the user-interface 106. In accordance with the preferred embodiment of the subject application, the query data further includes data representative of a designated external source of the content, such as, for example and without limitation, a web site hosted by the web server 114, a particular document from the document management server 116, a desired file from the network repository server 118, or the like. In such an embodiment, the external source is advantageously represented by a network address, such as an address stored in the data storage device 110, e.g., a bookmark, associated with the user identification data.

The query is then routed by the controller 108 associated with the document processing device 104 to the designated external source at step 408 via the computer network 102. It will be understood by those skilled in the art that when the content requested by the user requires authentication information as to the user's rights to access such content, the controller 108 associated with the document processing device 104 includes such identification information as received from the user in the query. At step 410 the content requested by the query is retrieved from the designated external source. Preferably such content is transmitted from the external source, e.g., web server 114, document management server 116, network repository server 118, or the like, to the document processing device 104 via the computer network 102. Flow proceeds to step 412, whereupon the content retrieved from the external source is routed to the output destination. For example, the content data is capable of being printed by the document processing device 104, transmitted via wireless transmission to the cell phone 130, transmitted via electronic mail to the user device 126 or the cell phone 130, or the like.

Figure 5:
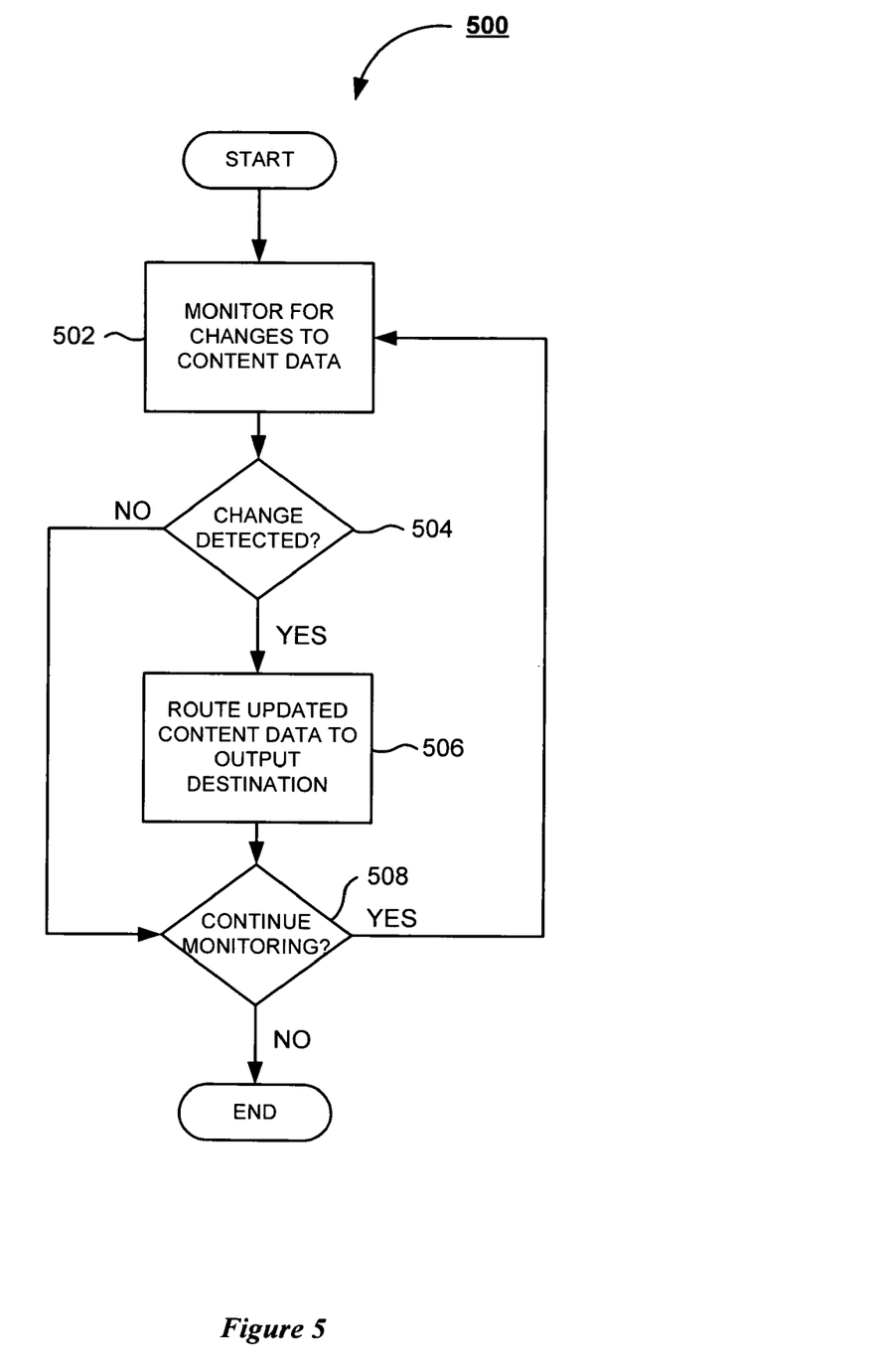
FIG. 5 is a flowchart illustrating an embodiment of the method for content retrieval and routing via a document processing device according to the subject application.

Referring now to FIG. 5, there is shown a flowchart 500 illustrating an embodiment of the method for content retrieval and routing via a document processing device in accordance with the subject application. At step 502, the document processing device 104 periodically monitors the external source for changes to the content data. A determination is then made by the controller 108 associated with the document processing device 104 at step 504 whether any changes to the content data have been detected. When changes are detected, flow proceeds to step 506, whereupon the updated content data is retrieved from the external source and routed to the designated output destination. In accordance with one aspect of the subject application, the output destination includes, for example and without limitation, the user-interface 106, a printer engine output, a remote electronic device, or the like. A determination is then made by the controller 108 whether the controller 108 is required to continue monitoring for updates to the content data at step 508. When the controller 108 associated with the document processing device 104 determines that it no longer is required to monitor for changes to the content data, the operation terminates. When the controller 108 is still required to monitor for changes, e.g., a predetermined period of time has not elapsed, or a cancel instruction has not yet been received, flow returns to step 502. When it is determined at step 504 that no changes to the content data have been detected, flow proceeds directly to the determination to continue monitoring at step 508. It will be understood by those skilled in the art that in accordance with the subject application, the monitoring aspect of the subject application, as set forth in FIG. 5, is capable of implementation in accordance with the method for content retrieval and routing via a document processing device as set forth above with respect to FIG. 4.

Figure 6:
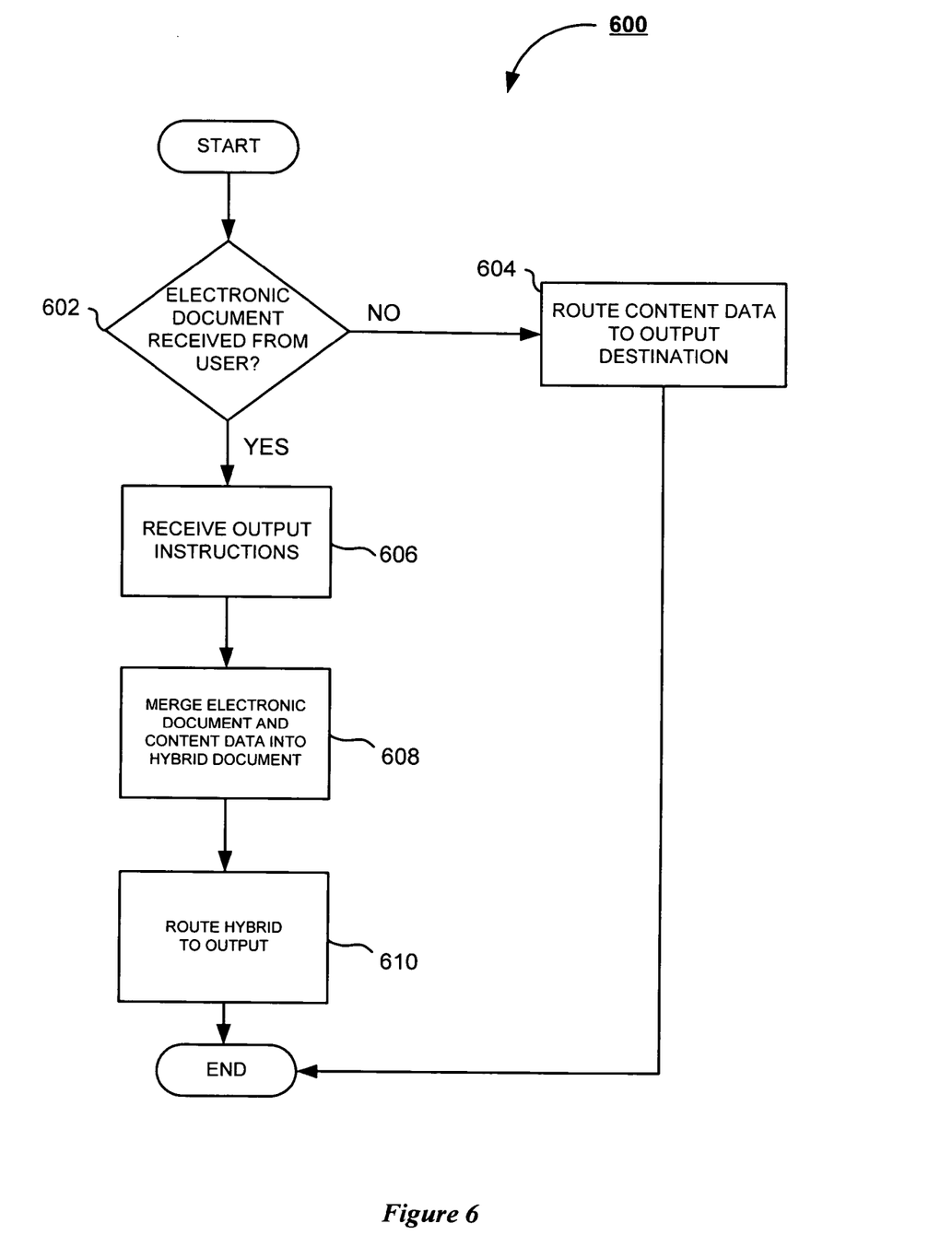
FIG. 6 is a flowchart illustrating an embodiment of the method for content retrieval and routing via a document processing device according to the subject application.

Turning now to FIG. 6, there is shown an embodiment of the method for content retrieval and routing via a document processing device in accordance with the subject application. At step 602, the controller 108 associated with the document processing device 104 makes a determination whether an electronic document, associated with the user, has been received. That is, the controller 108 associated with the document processing device 104 determines at step 602 whether the content requested by the user is to be combined or merged with an electronic document identified by the associated user. When such a combination is not indicated, the controller 108 associated with the document processing device 104 thereafter routes the content data to the output destination at step 604, following which the operation terminates.

Returning to step 602, when it is determined by the controller 108 associated with the document processing device 104 that an electronic document has been received or identified by the user and retrieved, flow proceeds to step 606, whereupon output instructions associated with the electronic document are received from the user via the associated user-interface 106. The electronic document and the retrieved content data are then combined, or merged, into a hybrid document at step 608. The hybrid document is then routed to the designated output destination at step 610. It will be appreciated by those skilled in the art that the methodology described in FIG. 6 is further capable of implementation in accordance with the monitoring aspect of the subject application, as set forth in FIG. 5, discussed above. The skilled artisan will appreciate that such monitoring of the external content, as explained in FIG. 5, is equally applicable to FIG. 4 and FIG. 6. Similarly, the hybridization aspect of the subject application espoused in FIG. 6, as the skilled artisan will comprehend, is capable of implementation in accordance with the method for content retrieval and routing via a document processing device as set forth above in FIG. 4. It will further be appreciated by those skilled in the art that while reference has been made above to an external source, the subject application is capable of retrieving data from the data storage device 110 and functioning in the manner described above, without departing from the scope of the subject application.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A content retrieval and routing via a document processing device having a CPU and further comprising:
   means for receiving identification data corresponding to an associated user via a user interface of an associated document processing device;
   means for receiving at least one electronic document selected by the associated user;
   means for receiving routing data representative of at least one desired output destination;
   means for receiving query data from the associated user, which query data is representative of desired content from at least one of a plurality of external data sources;
   means for executing a query on the at least one external data source in accordance with received query data;
   means for generating link data corresponding to received query data;
   means for merging link data corresponding to the received query data with the at least one electronic document so as to form a composite electronic document inclusive of the electronic document and the link data;
   means for receiving a plurality of document rendering requests corresponding to the composite electronic document;

means for retrieving content data from the at least one external data source in accordance with the execution of the query in accordance with link data merged with the electronic document;

integration means for integrating the at least one electronic document and the retrieved content data into a contiguous hybrid electronic document so as to form an electronic document formed from a merger thereof;

routing means for routing the hybrid electronic document to the at least one associated output in accordance with received routing data;

output means for outputting the hybrid electronic document in accordance with received routing data;

means for storing the electronic document and merged link data in an associated data storage;

means for selectively retrieving the stored electronic document and merged link data from the associated data storage;

means for re-executing the query on the at least one external data source in accordance with the link data merged with the electronic document;

means for receiving secondary routing data corresponding to the stored electronic document and merged link data retrieved from the associated data storage;

means for retrieving updated content data from the at least one external data source in accordance with the re-executed query;

wherein the integration means includes means for integrating the at least one updated hybrid electronic document and updated content data into an updated contiguous hybrid electronic document so as to form an updated electronic document output formed from the merger thereof; and means for commencing operation of the routing means and output means in connection with the updated hybrid electronic document in accordance with received secondary routing data.

2. The content retrieval and routing document processing device of claim 1 wherein the at least one output is comprised of at least one of a print, electronic mail, data file, wireless transmission and visual display.

3. The content retrieval and routing document processing device of claim 1 further comprising:

monitoring means for monitoring changes in content data; and means for initializing the means for retrieving updated content data upon a detection of changed content data by the monitoring means.

4. The content retrieval and routing document processing device of claim 1 further comprising network interface means for routing the query data to the at least one external data source via an associated network.

5. The content retrieval and routing document processing device of claim 1 wherein the content data includes at least one of financial data, weather data, schedule data, event data, website data and map data.

6. A method for content retrieval and routing via a document processing device comprising the steps of:

receiving identification data corresponding to an associated user via a user interface of an associated document processing device;

receiving at least one electronic document selected by the associated user;

receiving routing data representative of at least one desired output destination;

receiving query data from the associated user, which query data is representative of desired content from at least one of a plurality of external data sources;

executing a query on the at least one external data source in accordance with received query data;

generating link data corresponding to received query data;

merging link data corresponding to the received query data with the at least one electronic document so as to form a composite electronic document inclusive of the electronic document and the link data;

receiving a plurality of document rendering requests corresponding to the composite electronic document;

retrieving content data from the at least one external data source in accordance with the execution of the query in accordance with link data merged with the electronic document;

integrating the at least one electronic document and the retrieved content data into a contiguous hybrid electronic document so as to form an electronic document formed from a merger thereof;

routing the hybrid electronic document to the at least one associated output in accordance with received routing data;

outputting the hybrid electronic document in accordance with received routing data;

storing the electronic document and merged link data in an associated data storage;

selectively retrieving the stored electronic document and merged link data from the associated data storage;

re-executing the query on the at least one external data source in accordance with the link data merged with the electronic document;

receiving secondary routing data corresponding to the stored electronic document and merged link data retrieved from the associated data storage;

retrieving updated content data from the at least one external data source in accordance with the re-executed query;

integrating the at least one updated hybrid electronic document and updated content data into an updated contiguous hybrid electronic document so as to form an updated electronic document output formed from the merger thereof; and commencing operation of the routing and output in connection with the updated hybrid electronic document in accordance with received secondary routing data.

7. The method for content retrieval and routing via a document processing device of claim 6 wherein the at least one output is comprised of at least one of a print, electronic mail, data file, wireless transmission and visual display.

8. The method for content retrieval and routing via a document processing device of claim 6 further comprising the steps of:

monitoring changes in content data; and commencing the step of updating upon a detection of changed content data.

9. The method for content retrieval and routing via document processing device of claim 6 further comprising the step of routing the query data to the at least one external data source via an associated network.

10. The method for content retrieval and routing via a document processing device of claim 6 wherein the content data includes at least one of financial data, weather data, schedule data, event data, website data and map data.

11. A computer-implemented method for content retrieval and routing via a document processing device comprising the steps of:

receiving identification data corresponding to an associated user via a user interface of an associated document processing device;

receiving at least one electronic document selected by the associated user;

receiving routing data representative of at least one desired output destination;

receiving query data from the associated user, which query data is representative of desired content from at least one of a plurality of external data sources;

executing a query on the at least one external data source in accordance with received query data;

generating link data corresponding to received query data;

merging link data corresponding to the received query data with the at least one electronic document so as to form a composite electronic document inclusive of the electronic document and the link data;

receiving a plurality of document rendering requests corresponding to the composite electronic document;

retrieving content data from the at least one external data source in accordance with the execution of the query in accordance with link data merged with the electronic document;

integrating the at least one electronic document and the retrieved content data into a contiguous hybrid electronic document so as to form an electronic document formed from a merger thereof;

routing the hybrid electronic document to the at least one associated output in accordance with received routing data;

outputting the hybrid electronic document in accordance with received routing data;

storing the electronic document and merged link data in an associated data storage;

selectively retrieving the stored electronic document and merged link data from the associated data storage;

re-executing the query on the at least one external data source in accordance with the link data merged with the electronic document;

receiving secondary routing data corresponding to the stored electronic document and merged link data retrieved from the associated data storage;

retrieving updated content data from the at least one external data source in accordance with the re-executed query;

integrating the at least one updated hybrid electronic document and updated content data into an updated contiguous hybrid electronic document so as to form an updated electronic document output formed from the merger thereof; and commencing operation of the routing and output in connection with the updated hybrid electronic document in accordance with received secondary routing data.

12. The computer-implemented method for content retrieval and routing via a document processing device of claim 11 wherein the at least one output is comprised of at least one of a print, electronic mail, data file, wireless transmission and visual display and wherein the content data includes at least one of financial data, weather data, schedule data, event data, website data and map data.

13. The computer-implemented method for content retrieval and routing via a document processing device of claim 11 further comprising the steps of:

monitoring changes in content data; and commencing the step of updating upon a detection of changed content data.

14. The computer-implemented method for content retrieval and routing via document processing device of claim 11 further comprising the step of routing the query data to the at least one external data source via an associated network.

* * * * *